United States Patent
Inoue et al.

(10) Patent No.: US 9,313,231 B2
(45) Date of Patent: *Apr. 12, 2016

(54) INTER-DOMAIN REPLICATION OF SERVICE INFORMATION

(71) Applicant: International Business Machines Corporation, Armonk, NY (US)

(72) Inventors: Shigemitsu Inoue, Yokohama (JP); Yohsuke Ishii, Tokyo (JP); Koichi Nakamura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,256

(22) Filed: Nov. 14, 2014

(65) Prior Publication Data

US 2015/0067770 A1  Mar. 5, 2015

Related U.S. Application Data

(63) Continuation of application No. 13/890,820, filed on May 9, 2013, which is a continuation of application No. 13/424,970, filed on Mar. 20, 2012.

(51) Int. Cl.
*H04L 29/06* (2006.01)
*H04L 29/08* (2006.01)
*H04L 12/24* (2006.01)

(52) U.S. Cl.
CPC ............... *H04L 63/20* (2013.01); *H04L 29/08* (2013.01); *H04L 41/0246* (2013.01); *H04L 41/50* (2013.01); *H04L 63/0815* (2013.01); *H04L 63/10* (2013.01); *H04L 67/16* (2013.01)

(58) Field of Classification Search
None
See application file for complete search history.

(56) References Cited

U.S. PATENT DOCUMENTS

2002/0052966 A1   5/2002  Isomura et al.
2005/0232283 A1*  10/2005 Moyer ............... H04L 12/2803
                                                        370/401

(Continued)

FOREIGN PATENT DOCUMENTS

JP    12-140585 A    11/2001
JP    12-397001 A    7/2002

(Continued)

OTHER PUBLICATIONS

United States Patent and Trademark Office, Office Action for U.S. Appl. No. 13/424,970, Mar. 17, 2014, pp. 1-29, Alexandria, VA, USA.

(Continued)

*Primary Examiner* — Natisha Cox
(74) *Attorney, Agent, or Firm* — Lee Law, PLLC; Christopher B. Lee

(57) ABSTRACT

An automated conversion of service information that includes endpoint addresses of service providers and security policies between independent enterprise information technology (IT) management domains is performed using a federated gateway within each of the independent enterprise IT management domains that bridges the independent enterprise IT management domains. The automated conversion of the service information allows at least one service consumer application executing within a first independent enterprise IT management domain to use a local service definition format to access at least one remote service provider application with a remote service interface defined using a different remote service definition format for execution in a second independent enterprise IT management domain. Service provider application endpoint translation is dynamically performed, in response to at least one service request for the at least one remote service provider application, using the federated gateway within each of the independent enterprise IT management domains that bridges the independent enterprise IT management domains.

21 Claims, 10 Drawing Sheets

(56) References Cited

U.S. PATENT DOCUMENTS

| | | | |
|---|---|---|---|
| 2008/0069082 A1 | 3/2008 | Patrick | |
| 2009/0019421 A1* | 1/2009 | Barcia | G06F 8/316 717/102 |
| 2009/0070456 A1* | 3/2009 | Brown | G06Q 30/02 709/224 |
| 2009/0077251 A1* | 3/2009 | Brown | H04L 67/327 709/320 |
| 2009/0132712 A1* | 5/2009 | P | H04L 65/105 709/227 |
| 2010/0318609 A1* | 12/2010 | Lahiri | G06F 9/5072 709/205 |
| 2011/0125903 A1* | 5/2011 | Silva-Lepe | G06F 9/5055 709/226 |
| 2011/0238795 A1* | 9/2011 | Bauer | H04L 67/2838 709/220 |
| 2011/0289206 A1* | 11/2011 | Vecera | H04L 43/16 709/224 |
| 2012/0216268 A1 | 8/2012 | Kassaei et al. | |

FOREIGN PATENT DOCUMENTS

| | | |
|---|---|---|
| JP | 14-139687 A | 11/2003 |
| JP | 14-305974 A | 5/2004 |
| JP | 18-055655 A | 9/2007 |
| JP | 20-278412 A | 5/2010 |
| JP | 21-500741 A | 5/2011 |
| JP | 22-025841 A | 8/2011 |
| WO | 2009116945 A1 | 9/2009 |

OTHER PUBLICATIONS

United States Patent and Trademark Office, Notice of Allowance for U.S. Appl. No. 13/424,970, Aug. 26, 2014, pp. 1-14, Alexandria, VA, USA.

United States Patent and Trademark Office, Office Action for U.S. Appl. No. 13/890,820, Mar. 17, 2014, pp. 1-25, Alexandria, VA, USA.

United States Patent and Trademark Office, Notice of Allowance for U.S. Appl. No. 13/890,820, Aug. 15, 2014, pp. 1-14, Alexandria, VA, USA.

* cited by examiner

INTER-DOMAIN REPLICATION OF SERVICE INFORMATION

BACKGROUND

The present invention relates to service oriented architecture (SOA) and information technology (IT) management. More particularly, the present invention relates to inter-domain replication of service information.

Information technology (IT) systems are utilized to manage information within corporations and to manage information for clients of corporations. Service oriented architecture (SOA) may be used to build IT systems. With an SOA architected IT system, certain devices provide services and certain devices consume services of devices that provide services.

BRIEF SUMMARY

A method includes performing an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and dynamically performing, in response to at least one service request for the at least one remote service provider application, service provider application endpoint translation using the federated gateway within each of the independent enterprise IT management domains that bridges the independent enterprise IT management domains.

A system includes a federated gateway comprising at least a federated enterprise service bus (ESB) comprising a local ESB operable within a first independent enterprise information technology (IT) management domain to interconnect with a remote ESB operable within a second independent enterprise IT management domain and a processor programmed to: perform an automated conversion of service information comprising endpoint addresses of service providers and security policies between independent enterprise IT management domains using the federated gateway within each of the independent enterprise IT management domains that bridges the independent enterprise IT management domains, where the automated conversion of the service information allows at least one service consumer application executing within the first independent enterprise IT management domain to use a local service definition format to access at least one remote service provider application with a remote service interface defined using a different remote service definition format for execution in the second independent enterprise IT management domain; and dynamically perform, in response to at least one service request for the at least one remote service provider application, service provider application endpoint translation using the federated gateway within each of the independent enterprise IT management domains that bridges the independent enterprise IT management domains.

A computer program product includes a computer readable storage medium including computer readable program code, where the computer readable program code when executed on a computer causes the computer to: perform an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and dynamically perform, in response to at least one service request for the at least one remote service provider application, service provider application endpoint translation using the federated gateway within each of the independent enterprise IT management domains that bridges the independent enterprise IT management domains.

BRIEF DESCRIPTION OF THE SEVERAL VIEWS OF THE DRAWINGS

Figure (FIG.) 1 is a block diagram of an example of an implementation of a system for automated inter-domain replication of service information that provides interoperability between geographically and/or logically distributed IT management domains according to an embodiment of the present subject matter;

Figure (FIG.) 2 is a block diagram of an example of an implementation of a core processing module capable of performing automated inter-domain replication of service information according to an embodiment of the present subject matter;

Figure 1:
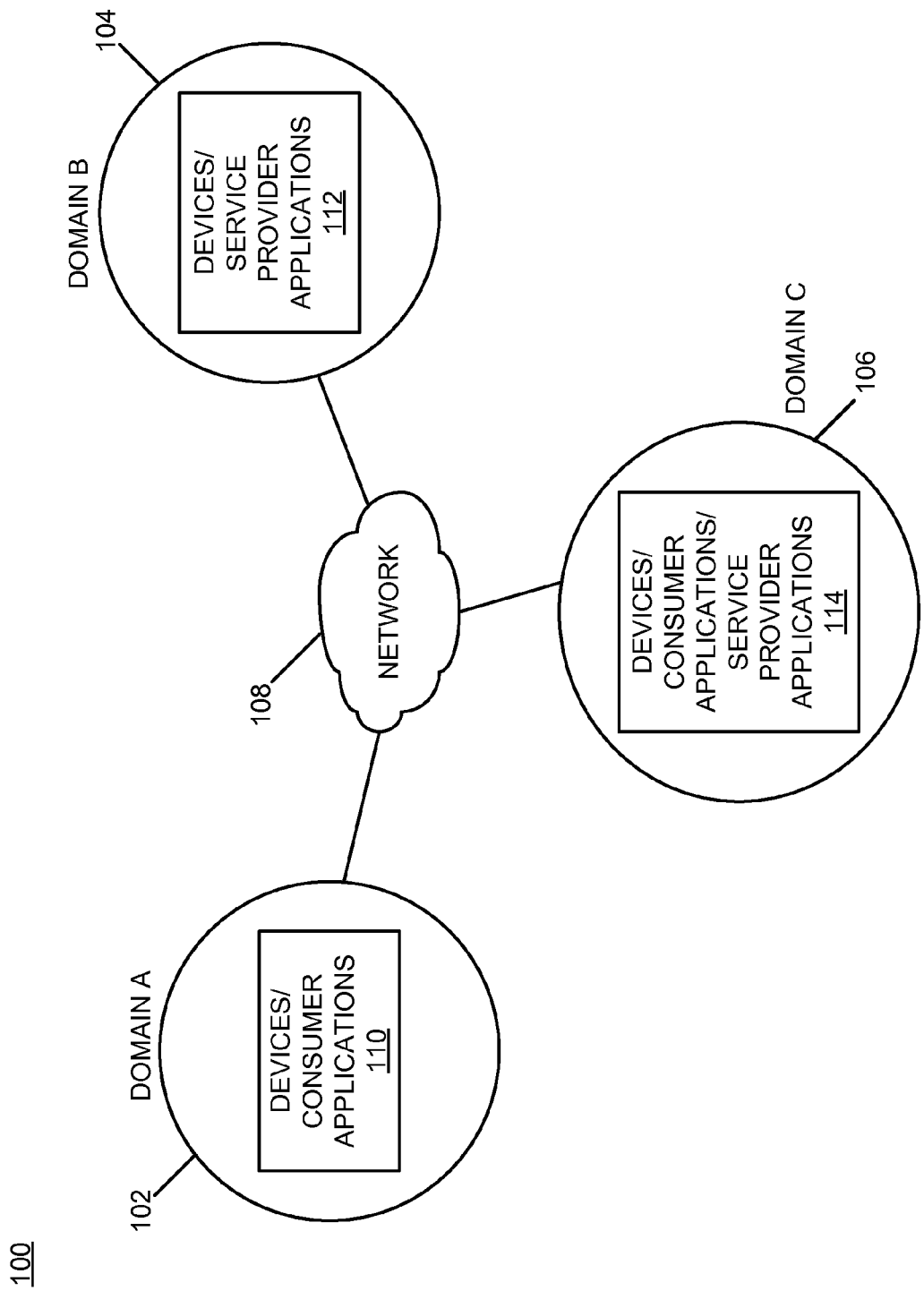

Figure (FIG.) 3 is a logical block diagram of an example of an implementation of an architectural interconnection (gateway) for automated inter-domain replication of service information between encapsulated and independent IT management domains, and provides an example of technology and processing for seamless integration of applications/services according to an embodiment of the present subject matter;

Figure (FIG.) 4 is an illustration of an example of an implementation of a flow process for automated inter-domain replication of service information between two independent IT management domains according to an embodiment of the present subject matter;

Figure (FIG.) 5 is a block diagram of an example of an implementation of a flow distribution for inter-domain replication and management of service information among global governance service registries deployed in multiple domains for sharing service information among the domains, and provides an example of technology and processing for service management for reuse according to an embodiment of the present subject matter;

Figure (FIG.) 6 is a block diagram of an example of an implementation of a flow distribution that provides for authentication and authorization between domains, and provides an example of technology and processing for security of information integration according to an embodiment of the present subject matter;

Figure (FIG.) 7 is a flow chart of an example of an implementation of a process for automated inter-domain replication of service information according to an embodiment of the present subject matter;

Figure (FIG.) 8 is a flow chart of an example of an implementation of a process for processing of automated inter-domain replication of service information by using promotions according to an embodiment of the present subject matter;

Figure (FIG.) 9 is a flow chart of an example of an implementation of a process for processing of an inter-domain service call using service information of a remote service provider of a remote independent IT management domain that has been replicated in an automated manner within a local domain of a service consumer according to an embodiment of the present subject matter; and Figure (FIG.) 10 is a flow chart of an example of an implementation of a process for processing of an inter-domain service call received from a service consumer in a remote independent IT management domain according to an embodiment of the present subject matter.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated inter-domain replication of service information. A federated gateway within each of multiple independent IT management domains bridges the independent IT management domains. As such, the independent IT management domains are in direct peer interaction. Service information of remote service providers, such as endpoint addresses of remote service providers and security policies, within remote independent IT management domains is automatically converted for use by service consumers in local independent IT management domains. The automated conversion of service information allows service consumer applications executing within one independent IT management domain to use local service definition formats appropriate for use within the local domain to access remote service provider applications with remote service interfaces defined using different remote service definition formats for execution in other independent IT management domains. As such, inter-domain integration of services is managed in an automated manner to allow remote service provider applications to be directly accessed without changing native protocols and security policies within independent service consumer IT management domains.

It should be noted that conception of the present subject matter resulted from recognition of certain limitations associated with service oriented architecture (SOA) and information technology (IT) management. For example, it was observed that many information technology regions/domains (hereinafter "regions" and "region," or "domains" and "domain," interchangeably) exist around the world, such as multiple enterprise IT environments, and that each geographic or logical region has its own specific IT management or development process/processes with its own policy implementations that are driven by requirements of local business. It was further observed that system and security management for each region is independent (e.g., silo model) of one another. It was additionally observed that each region generally has its own technical standards, which require batch file transfer or database (DB) replication as the only way to integrate systems among regions. Additionally, it was observed that service information management across domains is carried out manually, and that for service information that is to be shared across domains, manually copying of service information is conventionally performed.

In view of these observations, it was determined that if service information, which is important for ensuring the accuracy of dynamic routing, is managed manually, a problem exists in that the manual management may result in inaccuracy in conversion, and, therefore, management becomes more complex. It was consequently determined that next generation architecture (NGA), as described herein and referred to as automated inter-domain replication of service information, may make IT management systems flexible and agile for business changes and may improve IT management. SOA may be improved using the technology described herein by building an IT system with endpoint address translation components resident within independent IT management domains that may respond to a change in a business environment flexibly and quickly and promote the reuse of services. It was determined that it is valuable for speed and reliability of business decisions to realize the essence of SOA by integrating various domains within an enterprise environment (e.g., local offices of a global enterprise, suppliers, partners, etc.). For that purpose, it is was determined that it is desirable to realize total optimization by integrating global domains with respect to each domain's IT management and development processes that have already been structured/optimized individually (in such a way as not to impair the individual IT management and the individual development processes).

It was additionally determined that when applications are integrated across domains, the number of integrations will significantly increase if each application tries to communicate one by one in an uncontrolled manner. In addition, in such a case, it was determined that it is desirable for each application to implement the service integration individually.

It was additionally determined that the management of service information may be performed in a gateway pattern that is reflected in a service registration and repository (SRR) that may be used to ensure the accuracy of inter-domain dynamic routing. It was additionally determined that a mere copy of service registration information may not be sufficient for service information that is shared among the domains and that it is desirable to convert appropriate information depending on the circumstances for replication. With respect to service replication according to the present subject matter, in order to implement a domain-to-domain (inter-domain) service integration (e.g., service coordination between domains) accurately, the conversion is carried out automatically using endpoint address conversion instead of merely copying in service information management between SRRs deployed in different domains.

It was further determined that an ability to integrate global systems seamlessly by reusing global services would improve IT management. It was additionally determined that several business motivations may be improved by implementation and use of the automated inter-domain replication of service information systems described herein, such as for example, cost reductions, faster adaptation to market expansion, increased efficiency (e.g., real-time business data), and improved company image (e.g., a unified single entity). It was further determined that because each local operation base is completely independent of the others, each local operation base is placed on an equal footing with other remote operation bases. It was further noted that, because each region-directed operation represents an important corporate culture, top-down enforced global common optimization is not desirable. It was also determined that each region should maintain its own IT management and development process that best suits its requirements, and the present subject matter avoids adoption of common standards that would slow down each region's business.

Several technical challenges associated with the present subject matter were also determined and solved. For example, it was determined that if each application tries to communicate one by one to integrate regions, each application has to determine whether the service with which it is trying to integrate is in the same region or in another region. Additionally, it was determined that the number of links increases exponentially due to the occurrence of N*(N−1) mapping. Further, it was determined that routing as well as safety assurance may be used for each link.

The present subject matter improves geographically distributed IT management inter-domain interoperability by providing automated inter-domain replication of service information. The automated inter-domain replication of service information described herein builds a new platform that integrates regions all over the world. The present subject matter establishes an integrated link for exchanging information on a global level. An example of such an integrated link is an enterprise service bus (ESB) that functions as an inter-IT management domain gateway that is deployed in each domain. An inlet/outlet (entrance/exit) for establishing a link is limited to a single point in each domain. Integration between domains is established through the ESBs (also referred to as a federated ESB).

Using the present subject matter, each application does not have to be concerned with whether the service it is trying to integrate is in the same region or in another region (each application always connects to the federated ESB/gateway deployed within its region). As such, each domain is encapsulated to hide its inner components. Using the present subject matter, it is only the linkage component (e.g., the federated ESB/gateway) encapsulated within and operable between domains that is standardized and each region otherwise maintains autonomy. At each domain, any gap (difference) between the overall standard and the specification unique to the region may be bridged by conversion. Management responsibility apportioned to each region is defined within the respective regions.

Integration and reuse of applications/services between geographically or logically distributed local operational bases are implemented and provided with real-time IT management system integration, in addition to the batch file transfer and DB replication. The present subject matter integrates global information while implementing several security measures. For example, in a global enterprise, each region's system is independent even within a single company. Independence from the viewpoint of security is provided even in an intra-network connection. Utilizing the present subject matter, independent systems may be integrated with safety and security.

The present subject matter establishes a global standard of inter-domain service information management, while allowing each region to maintain significant independence. Each region's responsibility of the inter-domain service information management may be defined within each region/domain and separated.

The examples described below illustrate several principles of operation of the technology described herein. For example, the following examples describe, among other things, technology and processing for seamless integration of applications/services, service management for reuse, and security of information integration (authentication and authorization across domains). Asset registration may be performed using appropriate technology for the given implementation, such as intelligent random access memory (iRAM).

The present technology provides a gateway that is built within each domain. Service integration across domains (inter-domain) is established via the individual gateway. A call type (e.g., Request/Response call type) is provided for integration across domains. Conversion processing for inter-domain functionality may be performed at the gateway.

A common and unified security policy is used for inter-domain service integration, such as Security Assertion Markup Language (SAML). Dynamic routing is implemented. In order to call up a target service in a different domain via the gateway (e.g., inter-domain hopping) among various services provided in each domain, using dynamic routing, information on the target service is acquired dynamically and routed for indication of the specific service, the specific place/location where the service should be called up, the specific type of the service, etc. In order to perform dynamic inter-domain routing accurately, the present technology manages specific service information (e.g., an endpoint address where a service is available) within a service registry and repository (SRR), and returns that information to the gateway in reply to an inquiry received from the gateway.

When a single service is called up across domains using inter-domain calling, in many cases it may differ from one domain to another depending on the standardized items of domain-to-domain integration, despite the fact that the "correct" information of service managed in each domain pertains to the same service. For example, assuming that the standardized items mentioned above are adopted, the present technology manages the differences corresponding to each of them.

The "correct" endpoint managed in the SRR of a service consumer domain (a domain in which a service is called) is the gateway endpoint of a domain from which the service is provided (service provider domain), whereas the "correct" endpoint managed in the SRR of the service provider domain is the endpoint of the service provider itself. When a service interaction type that is different from a standard domain-to-domain call is used in an actual service, (e.g., a One-way type), the "correct" call-up service definition managed in the SRR of the service consumer domain is standard definition (e.g., a Request/Response type), whereas the "correct" call-up service definition managed in the SRR of the service provider domain is that of an actual service (e.g., the One-way type). When a security policy that is different from a standard domain-to-domain policy is used in an actual service, (e.g., username token), the "correct" security policy managed in the SRR of the service consumer domain is a standard policy (e.g., SAML), whereas the "correct" security policy managed in the SRR of the service provider domain is that of an actual service (e.g., username token).

In order to manage the above differences to implement inter-domain dynamic routing, the present subject matter provides for automated inter-domain replication of service information in which information used within the respective domains for consumption of services in other domains is converted in a programmatic and automated manner into a form required in the service consumer domain for the respective domain in contrast to merely copying when service information is shared among domains as with conventional technology. The automated inter-domain replication of service information described herein performs conversion as follows: an endpoint is replaced by another endpoint so that a service will be called up by way of a gateway; a service definition is re-written for protocol conversion; and, a piece of security policy information that is to be used for originating a call is replaced by another piece of security policy information. In such a way, the present technology effectively maps between domains at each level of inter-domain integration in an automated manner.

As described above and in more detail below, the present subject provides a solution for achieving both local optimization and total optimization of service information management. The present technology provides for automatically managing correct service information, which is useable for making it possible to establish a flexible and agile system link while placing a high value on the uniqueness of each domain. Specifically, with a focus on service information that is to be shared between domains, for which a mere copy is not acceptable, the present technology for replication by converting the service information based upon the situation instead of merely copying represents a solution that overcomes obstacles of previously existing systems. Further, the present technology provides a solution to the problem of manual management for integration according to previous systems, and offers improved integration across domains in terms of correctness, flexibility, and agility.

The automated inter-domain replication of service information described herein may be performed in real time to allow prompt interoperability between geographically and/or logically distributed IT management domains. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated inter-domain replication of service information that provides interoperability between geographically and/or logically distributed IT management domains. A Domain A 102, a Domain B 104, and a Domain C 106 are illustrated for purposes of example, though it is understood that many more domains may exist within a system such as the example system 100. The Domain A 102, the Domain B 104, and the Domain C 106 are considered independent IT management domains for purposes of the present examples, as described above and are interconnected by one or more connections, as described in more detail below, that are generally shown as a network 108. It is understood that computing devices, applications executing on computing devices, application servers, applications executing on application servers, network interconnections, and other operable applications, devices, and inter-connections form a portion of the system 100, though these are depicted generally within FIG. 1 for ease of illustration purposes as devices/consumer applications 110, devices/service provider applications 112, and devices/consumer applications/service provider applications 114, respectively.

As will be described in more detail below in association with FIG. 2 through FIG. 10, devices within the system 100 provide automated inter-domain replication of service information. The automated inter-domain replication of service information is based upon automated integration of independent IT management domains.

Figure 2:
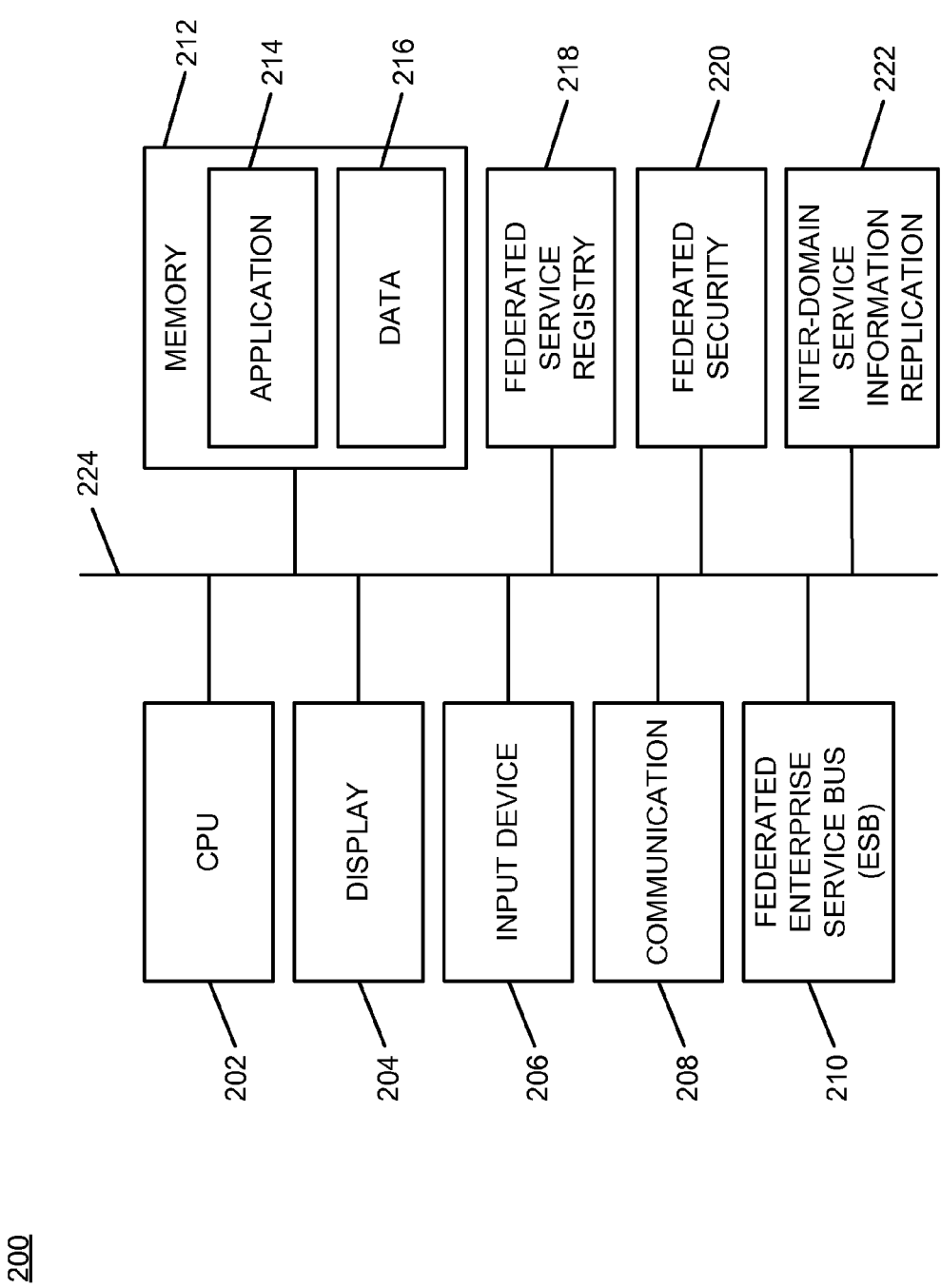

FIG. 2 is a block diagram of an example of an implementation of a core processing module 200 capable of performing automated inter-domain replication of service information. The core processing module 200 may be associated with any device operative within an IT management domain, such as the Domain A 102, the Domain B 104, and the Domain C 106 of FIG. 1. Further, the core processing module 200 may provide different and complementary processing of information, requests, services, etc., based upon functionality associated with each implementation, as described in more detail below.

As such, for any of the examples below, it is understood that any aspect of functionality described with respect to any one device that is described in conjunction with another device (e.g., sends/sending, requests/requesting, etc.) is to be understood to concurrently describe the functionality of the other respective device (e.g., receives/receiving, responds/responding, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. A federated enterprise service bus (ESB) 210 is also provided for certain communications, as described within the examples below.

The communication module 208 and the federated ESB 210 may include any electrical, protocol, and protocol conversion capabilities useable to provide the interconnection capabilities. Though the respective communication modules are illustrated as component-level modules for ease of illustration and description purposes, it should be noted that the respective communication modules may include any hardware, programmed processor(s), and memory used to carry out the functions of the communication modules as described above and in more detail below. For example, the communication modules may include additional controller circuitry in the form of application specific integrated circuits (ASICs), processors, antennas, and/or discrete integrated circuits and components for performing communication and electrical control activities associated with the communication modules. Additionally, the communication modules may include interrupt-level, stack-level, and application-level modules as appropriate. Furthermore, the communication modules may include any memory components used for storage, execution, and data processing for performing processing activities associated with the communication modules. The communication modules may also form a portion of other circuitry described without departure from the scope of the present subject matter.

A memory 212 includes an application area 214 that stores and allows execution of applications, such as service consumer applications and service provider applications, as described above and in more detail below. The memory 212 also includes a data storage area 216 that stores data for intermediate and/or long-term storage objectives.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, an operating system storage area, a code execution area, and a data area without departure from the scope of the present subject matter.

A federated service registry module 218, a federated security module 220, and an inter-domain service information replication module 222 are also illustrated. The federated service registry module 218, the federated security module 220, and the inter-domain service information replication module 222 provide respectively for service federation, security federation, and automated inter-domain replication of service information processing between encapsulated and independent IT management domains within the core processing module 200, as described above and in more detail below. The inter-domain service information replication module 222, in conjunction with the federated ESB 210, the federated service registry module 218, and the federated security module 220, implements the automated inter-domain replication of service information of the core processing module 200.

Though the federated service registry module 218, the federated security module 220, and the inter-domain service information replication module 222 are illustrated as component-level modules for ease of illustration and description purposes, it should be noted that these modules may include any hardware, programmed processor(s), and memory used to carry out the functions of these module as described above and in more detail below. For example, these modules may include additional controller circuitry in the form of application specific integrated circuits (ASICs), processors, and/or discrete integrated circuits and components for performing communication and electrical control activities associated with the respective devices. Additionally, these modules may include interrupt-level, stack-level, and application-level modules as appropriate. Furthermore, these modules may include any memory components used for storage, execution, and data processing for performing processing activities associated with the modules.

It should also be noted that the federated service registry module 218, the federated security module 220, and the inter-domain service information replication module 222 may form a portion of other circuitry described without departure from the scope of the present subject matter. Further, the federated service registry module 218, the federated security module 220, and the inter-domain service information replication module 222 may alternatively be implemented as one or more applications stored within the memory 212. In such an implementation, the respective module(s) may include instructions executed by the CPU 202 for performing the functionality described herein. The CPU 202 may execute these instructions to provide the processing capabilities described above and in more detail below for the core processing module 200. The respective module(s) may form a portion of an interrupt service routine (ISR), a portion of an operating system, a portion of a browser application, or a portion of a separate application without departure from the scope of the present subject matter.

It should be noted that certain registries described below may be implemented separately from the core processing module 200 and operably interconnected, or may be incorporated into the core processing module 200 without departure from the scope of the present subject matter. Accordingly, all such variations on architecture are considered within the scope of the present subject matter.

The CPU 202, the display 204, the input device 206, the communication module 208, the federated ESB 210, the memory 212, the federated service registry module 218, the federated security module 220, and the inter-domain service information replication module 222 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk, or other location, while the CPU 202 and memory 212 may be located at a local or remote server. Many other possible arrangements for components of the core processing module 200 are possible and all are considered within the scope of the present subject matter. Accordingly, the core processing module 200 may take many forms and may be associated with many platforms.

FIG. 3 through FIG. 6 described below represent example independent IT management domain architectures and interconnections for interoperability between the respective independent IT management domains. The example architectures that may be implemented and may be executed by devices, such as the core processing module 200, perform the automated inter-domain replication of service information associated with the present subject matter. Many other variations on the example architectures and interconnections are possible and all are considered within the scope of the present subject matter. The examples within FIG. 3 through FIG. 6 each provide examples of one or more of technologies and processing for seamless integration of applications/services, service management for reuse, and security of information integration (authentication and authorization across domains, as described above).

Figure 3:
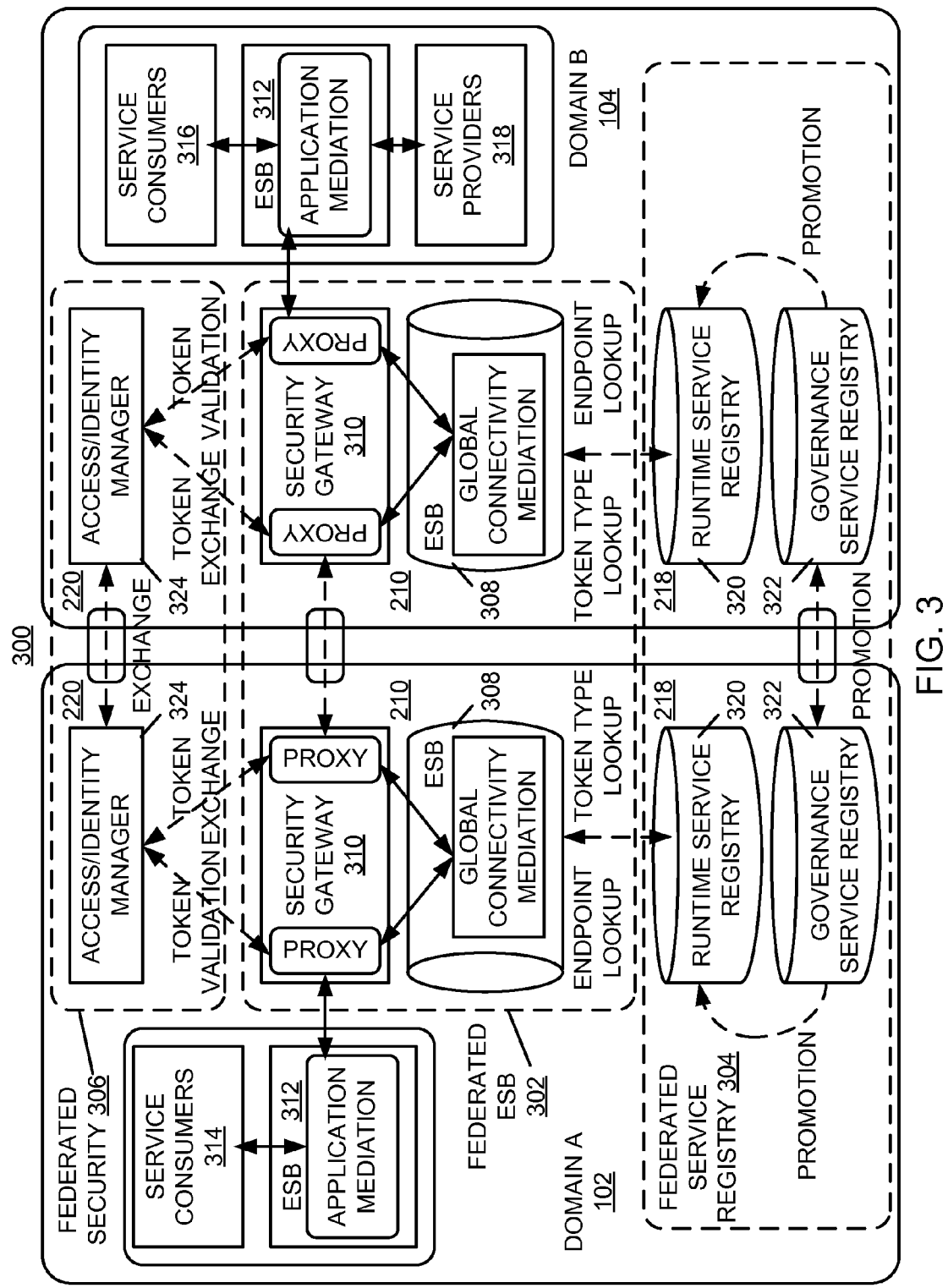

FIG. 3 is a logical block diagram of an example of an implementation of an architectural interconnection (gateway) 300 for automated inter-domain replication of service information between encapsulated and independent IT management domains, and provides an example of technology and processing for seamless integration of applications/services. The architectural interconnection (gateway) 300 implements dynamic routing and provides integration between encapsulated independent IT domains. The Domain A 102 and the Domain B 104 of FIG. 1 are utilized for purposes of illustration. However, it is understood that multiple additional domains may be implemented without departure from the scope of the present subject matter.

The present example logical architecture may be mapped onto one or more devices, such as the core processing module 200 of FIG. 2. As such, while certain logical components are illustrated as a logical entity within the respective Domain A 102 and Domain B 104, it is understood that these logical entities may be performed by one or more devices of the devices and modules described in association with FIG. 2 within the respective domains.

Spanning the Domain A 102 and the Domain B 104 is a logical federated enterprise service bus (ESB) gateway 302 that is implemented via one or more of the federated ESB 210 of FIG. 2, either in combination with the inter-domain service information replication module 222 or as a combined module, as described above, within each domain. Similarly, a logical federated service registry gateway 304 is implemented via one or more of the federated service registry modules 218, and a logical federated security gateway 306 is implemented via one or more of the federated security modules 220.

The logical federated ESB gateway 302, and in particular each federated ESB 210, implements an ESB 308 that each provide global connectivity mediation between the independent IT management Domain A 102 and the independent IT management Domain B 104. The logical federated ESB gateway 302, and in particular each federated ESB 210, also implements a security gateway 310 that provides proxy services between the independent IT management Domain A 102 and the independent IT management Domain B 104.

The security gateway 310 within each domain also provides proxy services between a local ESB 312 that coordinates application mediation and bridges routing between service consumers 314 and 316, and service providers 318 within the respective independent IT management domains. The service consumers 314 and 316, and service providers 318, represent the consumer applications and the service provider applications of the elements 110, 112, and 114, described in association with FIG. 1. It should be noted that the service consumers 314 and 316 represent entities that request services of the services providers 318. While the present example illustrates service providers 318 within the Domain B 104, it is understood that service providers may be provided within any domain.

The logical federated service registry gateway 304, and in particular each federated service registry module 218, implements a local runtime service registry 320. Routing information for integration is provided by the logical federated ESB gateway 302 to the service registry 320. The logical federated service registry gateway 304, and in particular each federated service registry module 218, also implements a governance service registry 322 that logically spans (e.g., bridges) service registration between the independent IT management Domain A 102 and the independent IT management domain B 104. Service promotion is performed by the governance service registry 322. As described above, services and service interfaces available within the respective domains may be automatically converted for use within the other domain(s). For purposes of the present description, this conversion may be considered promotion of the respective remote service for access via the local domain by registration of the respective converted service interface within the respective runtime service registry 320. The respective ESB 308 within each domain, and in particular the global connectivity mediation, may perform endpoint lookup and token type lookup within the respective runtime service registry 320. Accordingly, automated inter-domain replication of service information across and between independent IT management domains may be performed and services may be made available in formats and via protocols defined within the respective independent IT management domains.

The logical federated security gateway 306, and in particular each federated security module 220, implements a local access/identity manager module 324 that logically spans (e.g., bridges) security policy information between the independent IT management Domain A 102 and the independent IT management Domain B 104. Security management for integration is provided by the logical federated security gateway 306 by the access/identity manager module 324, such as authentication, authorization, and exchange of security tokens. The respective security gateway 310 within each domain, and in particular the respective proxies, may perform token validation and token exchange via the respective access/identity manager module 324.

As such, the respective independent IT management Domain A 102 and the independent IT management Domain B 104 may be configured for interoperability using the automated inter-domain replication of service information described herein. Service interfaces defined within a domain using particular interfaces and protocols may be automatically converted for consumption within other domains using the automated inter-domain replication of service information described herein.

Further, security management inside each domain is autonomous, and only the linkage component across the domains is standardized. Automatic conversion is executed on the gateway therebetween for integration, which provides federated security. An enterprise service bus (ESB), which functions as a gateway, is deployed in each domain. An inlet/outlet (entrance/exit) for establishing a link is limited to a single point. Integration between domains is established through the ESBs, which provides a federated ESB. A runtime service registry is deployed in each domain in order to store service information that is used for dynamic routing and to respond to an inquiry sent from the gateway. A global governance service registry is deployed in each domain. The global governance service registries share the service information with each other across domains, and each of them copies and converts (promotes) service information into the runtime service registry in each domain, which provides a federated service registry.

Figure 4:
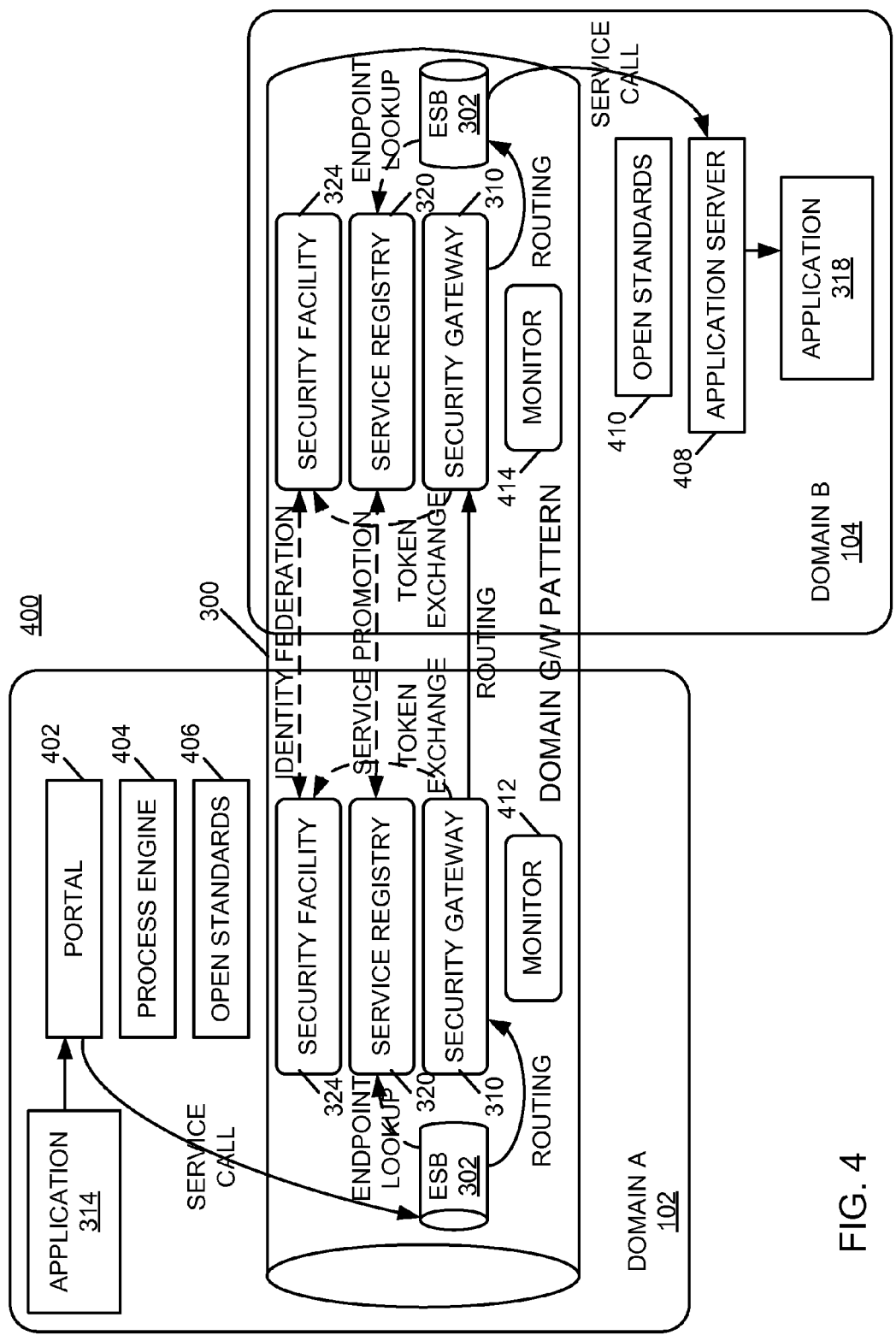

FIG. 4 is an illustration of an example of an implementation of a flow process 400 for automated inter-domain replication of service information between two independent IT management domains. The flow process 400 implements dynamic routing to provide integration between encapsulated and independent IT management domains. The Domain A 102 and the Domain B 104 of FIG. 1 are again utilized for purposes of illustration. However, it is understood that multiple additional domains may be implemented without departure from the scope of the present subject matter.

When a service consumer, such as one of the service consumers 314, (shown as "Application 314" in Domain A 102 of FIG. 4) calls up a service via a portal 402, a process engine 404 utilizing open standards 406 appropriate for the respective domain, issues a request (service call). That request (service call) is sent via the architectural interconnection (gateway) 300, to the logical federated ESB gateway 302 operating within the consumer's domain.

The architectural interconnection (gateway) 300 makes an inquiry to the runtime service registry 320 operating within the logical federated service registry gateway 304 (not shown within FIG. 4 due to space limitations within the drawing figure) to perform endpoint lookup and to obtain information on the service. For example, endpoint information is obtained that is to be used for a service call. In the case of a cross-domain service call, the endpoint of the architectural interconnection (gateway) 300 at the service-provider side is returned. Service definition information is obtained that is to be used for the service call. As described above, service promotion is performed by the governance service registry 322 (not shown in FIG. 4 due to space limitations within the drawing figure). In the case of a cross-domain service call, a standardized service definition (e.g., Request/Response type within the present example) for the particular calling/consumer domain is returned. Security policy information is obtained that is to be used for the service call. In the case of a cross-domain service call, a standardized security policy (e.g., SAML within the present example) for the particular calling/consumer domain) is returned.

The service definition information that is to be used for the service call in conjunction with the request is transferred to the logical federated security gateway 306 (not shown in FIG. 4 due to space limitations within the drawing figure) and the security gateway 310 to hand the service call over for routing and processing. In cooperation with the access/identity manager 324 operating within the logical federated security gateway 306 (not shown in FIG. 4 due to space limitations within the drawing figure) and the security gateway 310, the logical federated security gateway 306 and the security gateway 310 perform processing for conversion into the security policy that is necessary for a call, and routes/transmits the request (service call) to the endpoint that is to be used for the service call.

When the logical federated security gateway 306 (not shown in FIG. 4 due to space limitations within the drawing figure) and the security gateway 310 at the service-provider side (e.g., Domain B 104) receives the request/service call, it makes an inquiry to the runtime service registry 320 operating within the logical federated service registry gateway 304 inside the service provider's domain to obtain the information on the service. For example, endpoint information is obtained that is to be used for the service call. The endpoint of the respective service provider 318 (shown as "Application 318" in Domain B 104 of FIG. 4) itself is returned. Service definition information is obtained that is to be used for the service call. The service definition of the service provider itself (e.g., a One-way type within the present example, and different from the service consumer Request/Response type) is returned. Security policy information is obtained that is to be used for the service call. The security policy of the service provider itself (e.g., Username Token within the present example, and different from the service consumer SAML) is returned.

The service definition information that is to be used for the service call in conjunction with the request is transferred to the access/identity manager 324 operating within the logical federated security gateway 306 (not shown in FIG. 4 due to space limitations within the drawing figure) to hand over the processing of the service call. In cooperation with the access/identity manager 324, the logical federated security gateway 306 performs processing for conversion into the security policy that is to be used for the service call, and transmits the request to the endpoint, within the present example an application server 408 that is to be used for the service call, utilizing open standards 410 appropriate for the respective domain, and the service provider (e.g., the Application 318) is called. A monitor module 412 and a monitor module 414 provide monitoring, logging, and other capabilities.

In order to provide the flow described above, service information managed at the respective runtime service registries 320 of each domain, is different. Service information managed at the runtime service registry 320 of the domain, such as the Domain A 102, in which a service is called up (service consumer domain) may be different from service information managed at the runtime service registry 320 of the domain, such as the Domain B 104, from which the service is provided (service provider domain). In the above example, differentiation is provided for each of the endpoint information that is used for the service call, the service definition information that is used for the service call, and the security policy information that is used for the service call. As such, identity federation, service promotion, and routing is performed between independent and encapsulated IT management domains utilizing the automated inter-domain replication of service information described herein.

Figure 5:
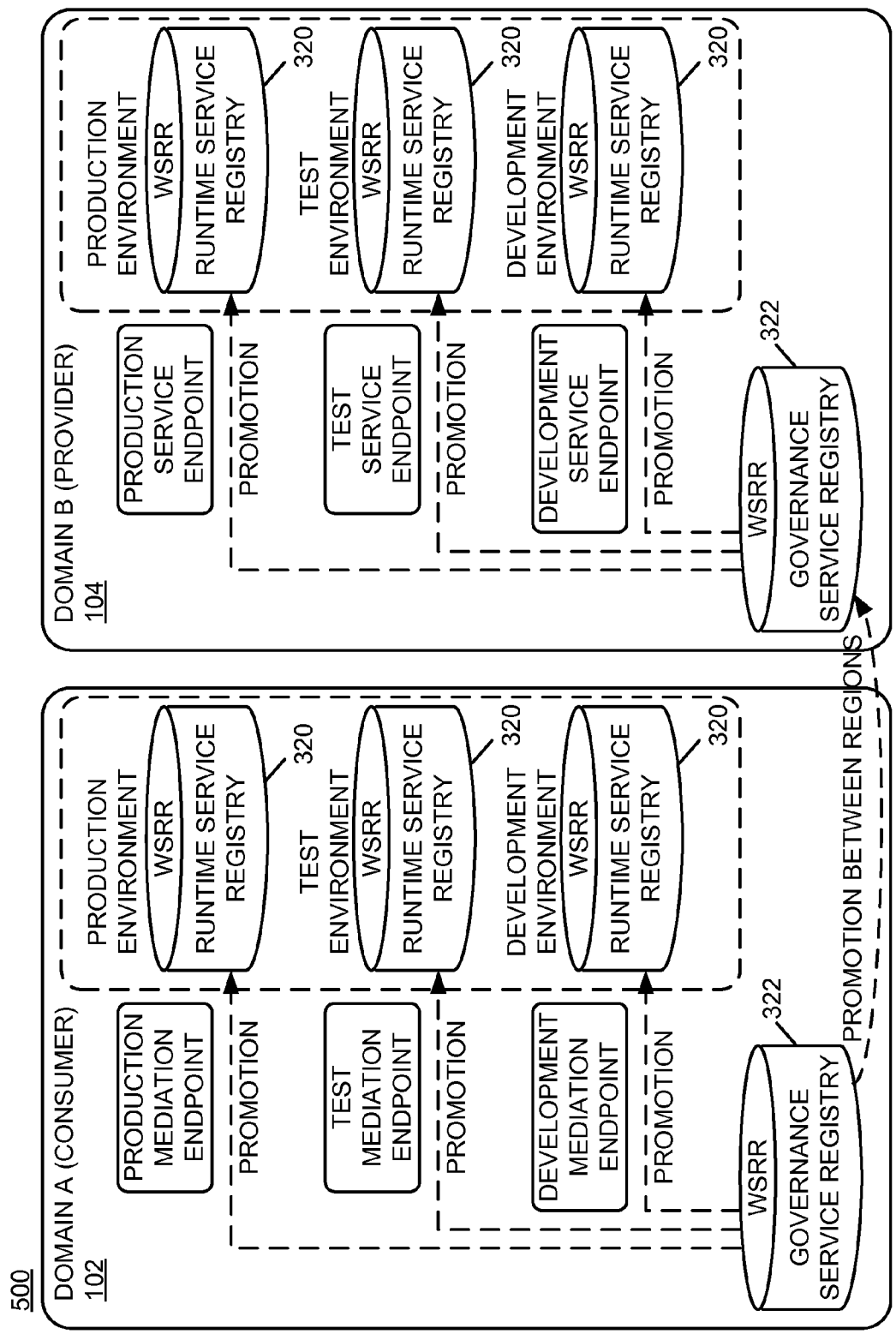

FIG. 5 is a block diagram of an example of an implementation of a flow distribution 500 for replication and management of service information among global governance service registries, such as the governance service registry 322, deployed in multiple domains (Domain A 102 and Domain B 104 within the present example) for sharing service information among the domains, and provides an example of technology and processing for service management for reuse. A runtime service registry 320 is deployed in each environment (development, test, and production) of each domain to accommodate production lifecycles. The runtime service registry 320 retains endpoint information and enables dynamic routing. Service information is copied and converted (termed promotion herein) into the respective runtime service registry 320, thereby enabling dynamic routing to be made in response to an inquiry sent from a gateway.

A governance service registry 322 is deployed in each domain. The governance service registry 322 provides management responsibility and ensures that management responsibility is apportioned to each domain. Endpoint information is sent (promoted) from the governance service registry 322 to the runtime service registry 320 at the responsibility of each domain. Service information is exposed from one domain to others by sharing the information from the respective domain's governance service registry 322 with other domains. The runtime environment of a domain is not allowed to be accessed from any other domains. An inlet/outlet (entrance/exit) for integration is limited to provide independence and autonomy for the respective domains.

The service information exposed to other domains, the original endpoint (provider domain) value is changed to an appropriate value for the consuming domain. The original endpoint points to the service provider's address to call the service. However, the endpoint exposed to other domains points to the gateway address of the provider's domain because the gateway is the only entrance from other domains to the provider's domain. Changing the endpoint value automatically when the endpoint is exposed to other domains provides smooth integration among independent domain gateway patterns.

It should additionally be noted that the respective runtime service registries 320 may be implemented using WebSphere® service registry and repository (WSRR).

Even for the same service, information utilized in each domain may differ. The present subject matter provides technology to manage such different information correctly and methodically, to provide for replication among global governance service registries, and to convert service information into a form consumable by the requesting domain via automated replication instead of merely copying. For example, a service endpoint may be re-written so that a service will be called up within the consumer domain by way of a gateway using service definition formats and protocols of the consuming domain (rather than the native provider domain service definition formats and protocols), and conversion of service calls to the native provider definition formats and protocols is performed in an automated manner without requiring changes to the consumer domain for the particular service.

Several aspects for realizing automated replication are represented within the present description. Example aspects including definition of a standard for domain-to-domain integration, automated conversion methodology, and replication methodology represent several of the aspects solved by the present subject matter. These example aspects are expanded upon within the following paragraphs.

Regarding definition of a standard for domain-to-domain integration, automated replication may be realized as a result of converting information that is unique to each domain into a standard for domain-to-domain integration (link between domains) and sharing that converted information, wherein such unique information is defined by a service provider. For this purpose, it is appropriate to define a standard for domain-to-domain integration so that it may be referred to at the time of conversion. Items that are helpful for definition are, for example, an identifier (ID), a name of the particular standardization used (Name), a target object (Target) of standardization (e.g., web services description language (WSDL)), a particular operation (Operation) of the definition (e.g., replacement, addition, deletion, etc.), items (Item) of standardization (e.g., extensible markup language path language (XPATH®) in WSDL when WSDL is employed), and a standardization value (Value), among others.

The following items represented within Table 1 are defined in the above example.

TABLE 1

Example Definitions

| ID | Name | Target | Operation | Item | Value |
|---|---|---|---|---|---|
| S001 | G/W Endpoint | WSDL | replace part | /definitions/service/port/address/location | Value0 |
| S002 | Security Policy | WSDL | replace | /definitions/Policy/SupportingTokens/Policy | Value1 |
| S003 | Service Definition (Oneway-> Req/Rep) | WSDL | add if no data exists | /definitions/binding/operation | Value2 |
|  |  |  | add if no data exists | /definitions/types/schema | Value3 |
|  |  |  | add if no data exists | /definitions | Value4 |
|  |  |  | add if no data exists | /definitions/portType/operation | Value5 |
| ... | ... | ... | ... | ... | ... |

Within Table 1 above, several value elements (Value column) are represented symbolically due to page size limitations (e.g., Value1, etc.). For purposes of the present examples, these value elements may include the following information values, in pseudo syntax format.

For the value Value0 (note that this is a stored value referenced within Table 1 above):

Value0=dddd.dddd.dddd.dddd

For the value Value1 (note that this is a stored value referenced within Table 1 above):

Value1=<namespace of the token profile>

For the value Value2 (note that this is a stored value referenced within Table 1 above):

```
Value2 =
    <wsdl:output name="operationResponse">
        <soap12:body use="literal"/>
    </wsdl:output>
```

For the value Value3 (note that this is a stored value referenced within Table 1 above):

```
Value3 =
    <xsd:element name="operationResponse">
        <xsd:complexType>
            <xsd:sequence>
                <xsd:element name="output" nillable="true"
                type="xsd:anyType"/>
            </xsd:sequence>
        </xsd:complexType>
    </xsd:element>
```

For the value Value4 (note that this is a stored value referenced within Table 1 above):

```
Value4 =
    <wsdl:message name="operationResponseMsg">
        <wsdl:part element="tns:operationResponse"
        name="operationResult"/>
    </wsdl:message>
```

For the value Value5 (note that this is a stored value referenced within Table 1 above):

Value5=<wsdl:output message="tns:operationResponseMsg"name="operationResponse"/>

Regarding automated conversion methodology, a copy of an object of an original service interface as a conversion target is created. The definition of a standard for domain-to-domain integration is then evaluated from the top. Applicable items in the target object are converted automatically within the designated conversion operation.

For example, in the above example, as a first step, a copy of WSDL managed in its own domain is created. Then, S001 is evaluated to replace the host name designated at /definitions/service/port/ address/location by the defined value. As a result of the above change, the location is converted from a location pointing to the actual service provider in the original service interface into a location pointing to the gateway inside its own domain.

As such, for S001, for purposes of the present example, it is assumed that the original location is:

<soap:address location="http://aaa.aaa.aaa.aaa/bbb/ccc"/>

As can be seen from the pseudo syntax below, the value Value0 is used such that the conversion may be in a form as follows:

<soap:address location="http://dddd.dddd.dddd.dddd/bbb/ccc"/>

S002 is thereafter evaluated to replace the type of a security policy designated at /definitions/Policy/SupportingTokens/Policy by the defined value. As a result of the above change, the type is converted from a security policy type used in its own domain in the original security policy type into a type standardized for domain-to-domain integration.

As such, for S002, for purposes of the present example, it is assumed that the original security policy type is:

```
<wsp:Policy wsu:Id="6aa19b16-0706-42ec-b110-810771e3e039"><ns1:SupportingTokens
xmlns:ns1="http://docs.oasis-open.org/ws-sx/ws-
securitypolicy/200702"><wsp:Policy><ns1:UsernameToken
ns1:IncludeToken="http://docs.oasis-open.org/ws-sx/ws-
securitypolicy/200702/IncludeToken/Always"><wsp:Policy><ns1:WssUsernameToken10/
></wsp:Policy></ns1:UsernameToken></wsp:Policy></ns1:SupportingTokens></wsp:Poli
cy>
```

As can be seen from the pseudo syntax below, the value Value1 is used such that the conversion may be in a form as follows:

```
<wsp:Policy wsu:Id="6aa19b16-0706-42ec-b110-810771e3e039"><ns1:SupportingTokens
xmlns:ns1="http://docs.oasis-open.org/ws-sx/ws-
securitypolicy/200702"><wsp:Policy><ns9:CustomToken
xmlns:ns9="http://www.ibm.com/xmlns/prod/websphere/200710/ws-securitypolicy-ext"
ns1:IncludeToken="http://docs.oasis-open.org/ws-sx/ws-
securitypolicy/200702/IncludeToken/Always"><wsp:Policy><ns9:WssCustomToken
localname="http://docs.oasis-open.org/wss/oasis-wss-saml-token-profile-
1.1#SAMLV1.1"/></wsp:Policy></ns9:CustomToken></wsp:Policy></ns1:SupportingTok
ens></wsp:Policy>
```

S003 is then evaluated. If the defined item does not exist at each of /definitions/binding/operation, /definitions/types/schema, /definitions, and /definitions/portType/operation, the value is added. As a result of the above change, the operation is converted from an operation having service definition for One-way calling into an operation having service definition for Request/Response calling that is standardized for domain-to-domain integration.

As such, for S003, for purposes of the present example, it is assumed that the original service definition is:

```
<xsd:element name="operation">
    <xsd:complexType>
        <xsd:sequence>
            <xsd:element name="input" nillable="true" type="xsd:string"/>
        </xsd:sequence>
    </xsd:complexType>
</xsd:element>
.......
<wsdl:message name="operationRequestMsg">
    <wsdl:part element="tns:operation" name="operationParameters"/>
</wsdl:message>
.......
<wsdl:portType name="TestSampleIF">
    <wsdl:operation name="operation">
        <wsdl:input message="tns:operationRequestMsg" name="operationRequest"/>
    </wsdl:operation>
</wsdl:portType>
.......
<wsdl:operation name="operation">
    <soap12:operation
soapAction="http://TestSampleMediation/TestSampleIF/TestSampleIF/operation"/>
    <wsdl:input name="operationRequest">
        <soap12:body use="literal"/>
    </wsdl:input>
</wsdl:operation>
...
```

As can be seen from the pseudo syntax below, the value Value2 is used such that the conversion may be in a form as follows:

```
<xsd:element name="operation">
    <xsd:complexType>
        <xsd:sequence>
            <xsd:element name="input" nillable="true" type="xsd:string"/>
        </xsd:sequence>
    </xsd:complexType>
</xsd:element>
```

```
    <xsd:element name="operationResponse">
        <xsd:complexType>
            <xsd:sequence>
                <xsd:element name="output" nillable="true" type="xsd:anyType"/>
            </xsd:sequence>
        </xsd:complexType>
    </xsd:element>
.......
    <wsdl:message name="operationRequestMsg">
        <wsdl:part element="tns:operation" name="operationParameters"/>
    </wsdl:message>
    <wsdl:message name="operationResponseMsg">
        <wsdl:part element="tns:operationResponse" name="operationResult"/>
    </wsdl:message>
.......
    <wsdl:portType name="TestSampleIF">
        <wsdl:operation name="operation">
            <wsdl:input message="tns:operationRequestMsg" name="operationRequest"/>
            <wsdl:output message="tns:operationResponseMsg" name="operationResponse"/>
        </wsdl:operation>
    </wsdl:portType>
.......
    <wsdl:operation name="operation">
        <soap12:operation
soapAction="http://TestSampleMediation/TestSampleIF/TestSampleIF/operation"/>
        <wsdl:input name="operationRequest">
            <soap12:body use="literal"/>
        </wsdl:input>
        <wsdl:output name="operationResponse">
            <soap12:body use="literal"/>
        </wsdl:output>
</wsdl:operation>
. . .
```

Regarding replication methodology, service information that has been subjected to a change from the global governance service registry of the service provider domain into the global governance service registry of the service consumer domain (i.e., service information conforming to the standard for domain-to-domain integration) is copied when appropriate, thereby ending the process of automated replication. By this approach, it is possible to correctly and confidently manage different information required in each domain even for the same service.

Figure 6:
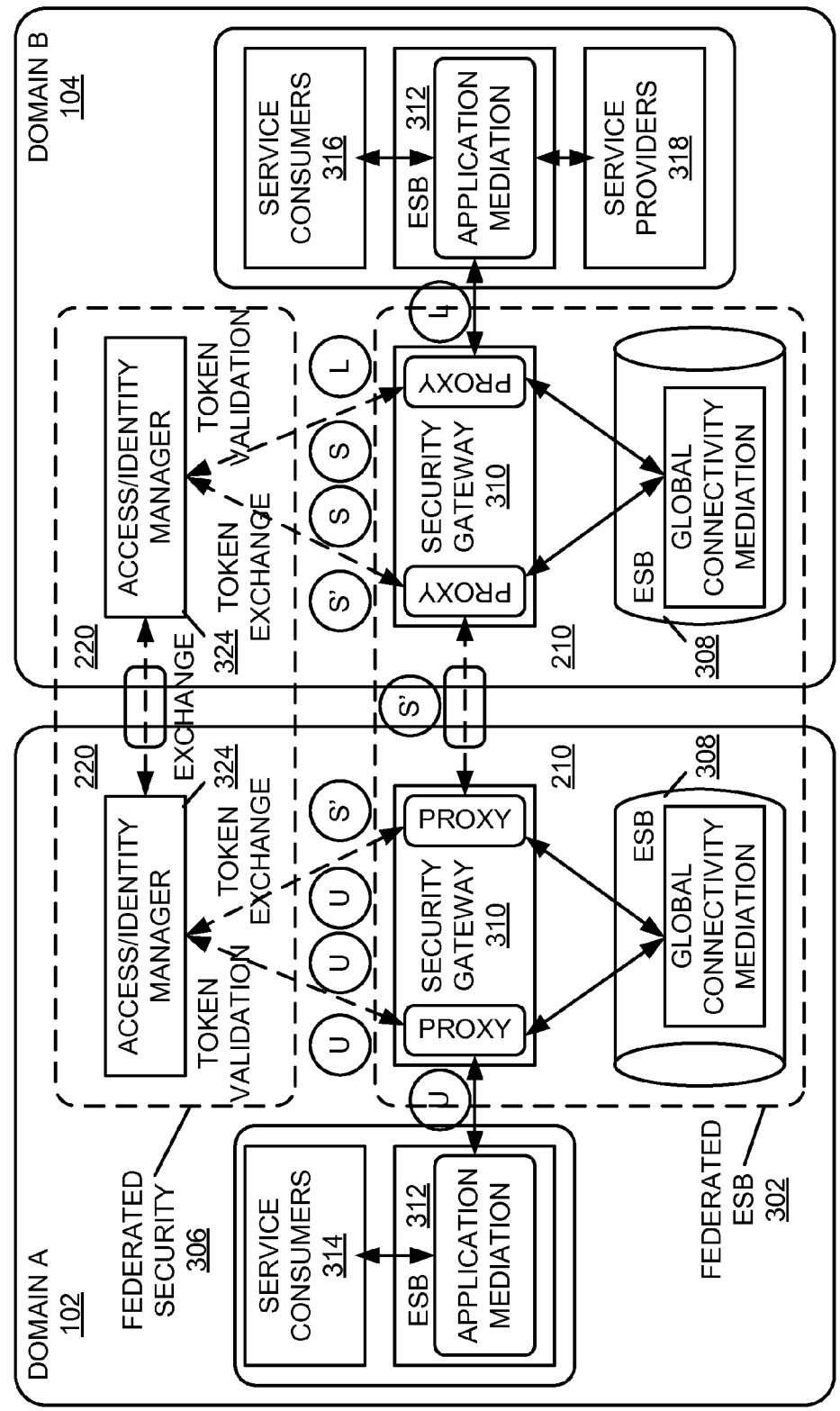

FIG. 6 is block diagram of an example of an implementation of a flow distribution 600 that provides for authentication and authorization between domains, and provides an example of technology and processing for security of information integration. Any appropriate standard, such as WS-Security, may be used for the integration as appropriate for a given implementation. Security tokens, such as security tokens in WS-Security, are sent out to other domains for their authentication and authorization. Only security token among domains is standardized globally (e.g., SAML Token), and the global standard and each domain's original token (e.g., Username Token, lightweight third party authentication (LTPA) Token, etc.) are exchanged on each gateway for integration among domains. As such, FIG. 6 illustrates that different token types may be utilized within the same integration as represented by the symbols "U" representing a Username Token, "L" representing an LTPA token, "S" representing an SAML token, and "S'" (S prime) representing a signed SAML token. The type of the security token to be exchanged for the integration is stored and managed in the respective runtime service registries 320 (not shown in FIG. 6), and it is looked up from the gateway. This form of token integration further facilitates the domain gateway pattern to encapsulate each domain and preserve a maximum independence of each domain.

Authentication among domains may be considered mandatory. It is not each user, but each domain that is authenticated on the integration (it may be considered a precondition that each user has been authenticated inside its domain before the integration). Only domain certifications are exchanged among domains. Each domain is authenticated by the security token signed with the certification.

Authorization among domains may be considered an application selectable feature. Each user's access may be controlled with role-based authorization. All user identifiers (IDs) are exchanged among domains. Service level authorization may be defined by any standard appropriate for a given implementation, such as WS-Trust and implemented by products. Service operation level authorization may also be utilized.

FIG. 7 through FIG. 10 described below represent example processes that may be executed by devices, such as the core processing module 200, to perform the automated inter-domain replication of service information associated with the present subject matter. Many other variations on the example processes are possible and all are considered within the scope of the present subject matter. The example processes may be performed by modules, such as the inter-domain service information replication module 222, in conjunction with the federated ESB 210, the federated service registry module 218, and the federated security module 220, and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 7:
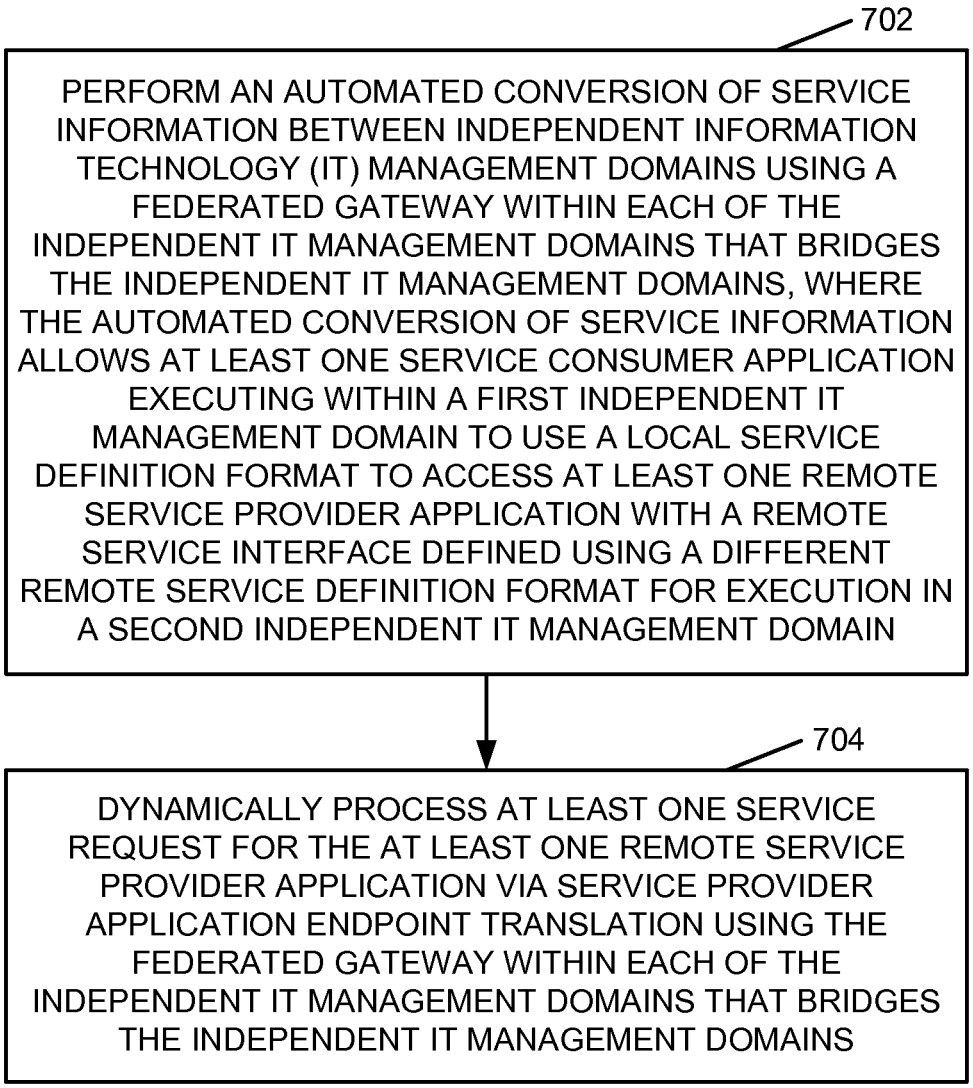

FIG. 7 is a flow chart of an example of an implementation of a process 700 for automated inter-domain replication of service information. At block 702, the process 700 performs an automated conversion of service information between independent information technology (IT) management domains using a federated gateway within each of the independent IT management domains that bridges the independent IT management domains, where the automated conversion of service information allows at least one service consumer application executing within a first independent IT management domain to use a local service definition format to access at least one remote service provider application with a remote service interface defined using a different remote service definition format for execution in a second independent IT management domain. At block 704, the process 700 dynamically processes at least one service request for the at least one remote service provider application via service provider application endpoint translation using the federated gateway within each of the independent IT management domains that bridges the independent IT management domains.

Figure 8:
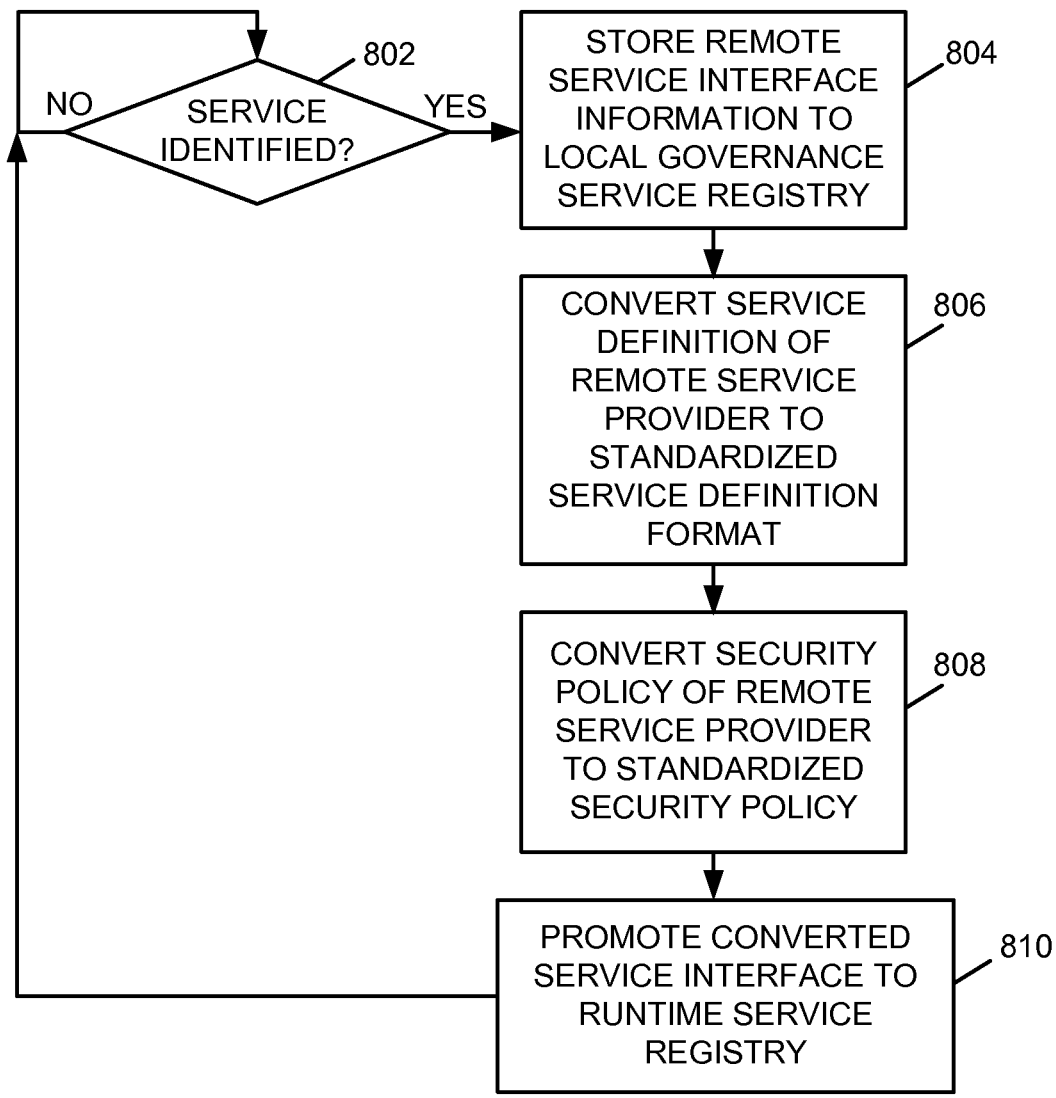

FIG. 8 is a flow chart of an example of an implementation of a process 800 for processing of automated inter-domain replication of service information by using promotions. At decision point 802, the process 800 makes a determination as to whether a remote service that is available for integration has been identified, such as within a remote governance service registry 322 within the Domain B 104 of the logical federated service registry gateway 304, as described within the examples above. In response to determining that a remote service has been identified for integration, at block 804 the process 800 stores remote service interface information to a local governance service registry 322 within the Domain A 102 of the logical federated service registry gateway 304. The order of processing shown is not to be considered limiting. For example, the processing shown may be performed as block 806, followed by block 808, followed by block 804 without departure from the scope of the present subject matter.

At block 806, the process 800 converts the service definition of the remote service provider to a standardized service definition format that is used for integration between the two independent IT management domains. At block 808, the process 800 converts a security policy of the remote service provider to a standardized security policy that is used for integration between the two independent IT management domains. At block 810, the process 800 promotes the converted service interface to the runtime service registry 320 of the logical federated service registry gateway 304 within the Domain A 102. The process 800 returns to decision point 802 to await identification of another remote service provider for integration.

Figure 9:
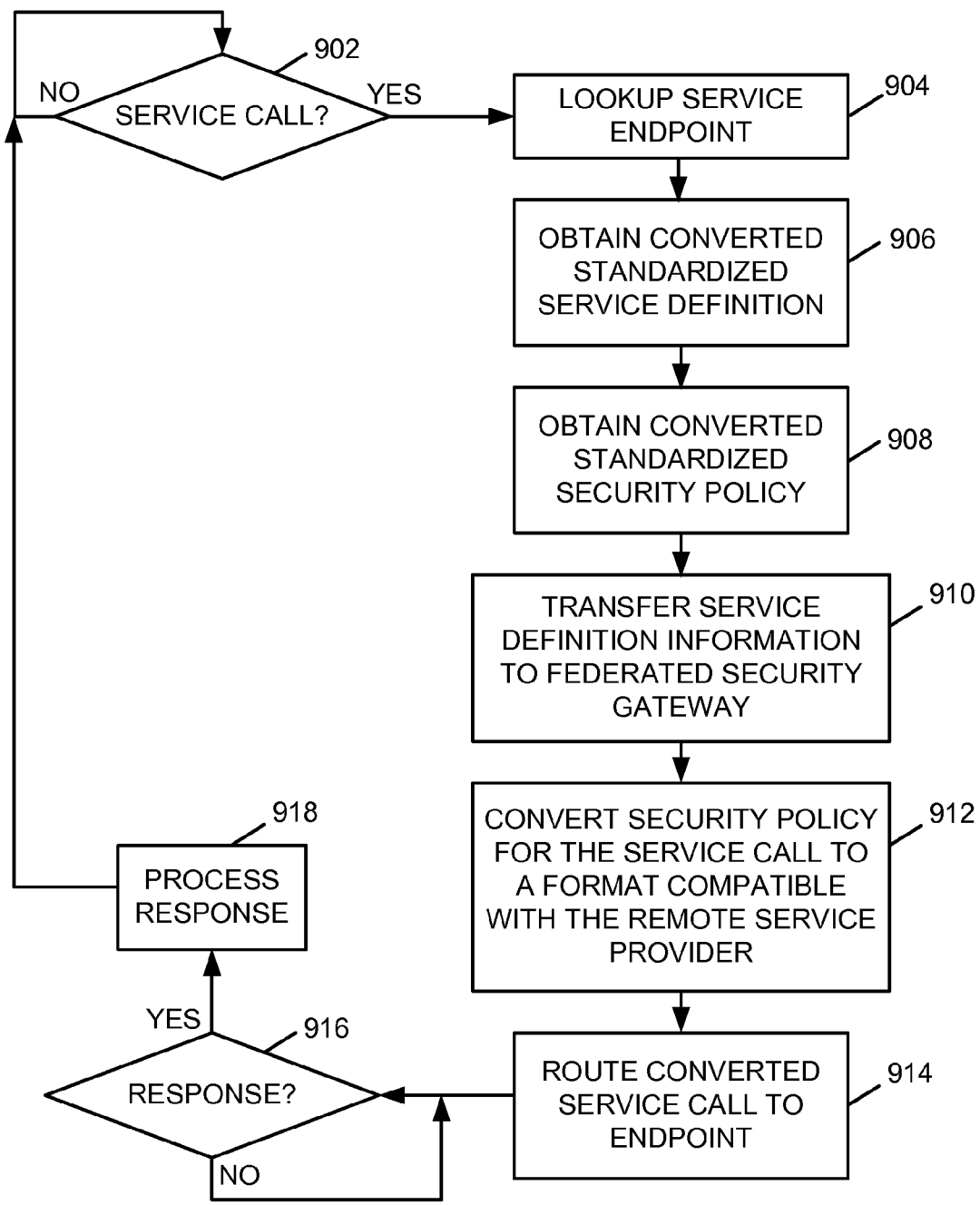

FIG. 9 is a flow chart of an example of an implementation of a process 900 for processing of an inter-domain service call using service information of a remote service provider of a remote independent IT management domain that has been replicated in an automated manner within a local domain of a service consumer. At decision point 902, the process 900 makes a determination as to whether a service call has been detected, such as at the logical federated ESB gateway 302 within the Domain A 102 of the architectural interconnection (gateway) 300. In response to determining that a service call has been detected, at block 904 the process 900 performs a lookup of the service endpoint associated with the service call. As described above, the endpoint that is returned will be the gateway at the service provider side of the transaction.

At block 906, process 900 obtains a converted standardized service definition for the remote service provider. At block 908, the process 900 obtains a converted standardized security policy. At block 910, the process 900 transfers the service definition information to a logical federated security gateway 306, such as the security gateway 310 within the Domain A 102, for routing.

At block 912, in cooperation with the access/identity manager 324 operating within the logical federated security gateway 306, the process 900 converts the security policy for the service call to a format compatible with remote service provider. At block 914, the service call is routed to the service endpoint.

At decision point 916, the process 900 waits for a response to the service call to be received. As described above, for purposes of the present examples, it is assumed that the service consumers 314 within the Domain A 102 utilize a Request/Response protocol. In response to determining that a response to the service call has been received, the process 900 performs processing of the received response at block 918. The process 900 returns to decision point 902 and iterates as described above.

Figure 10:
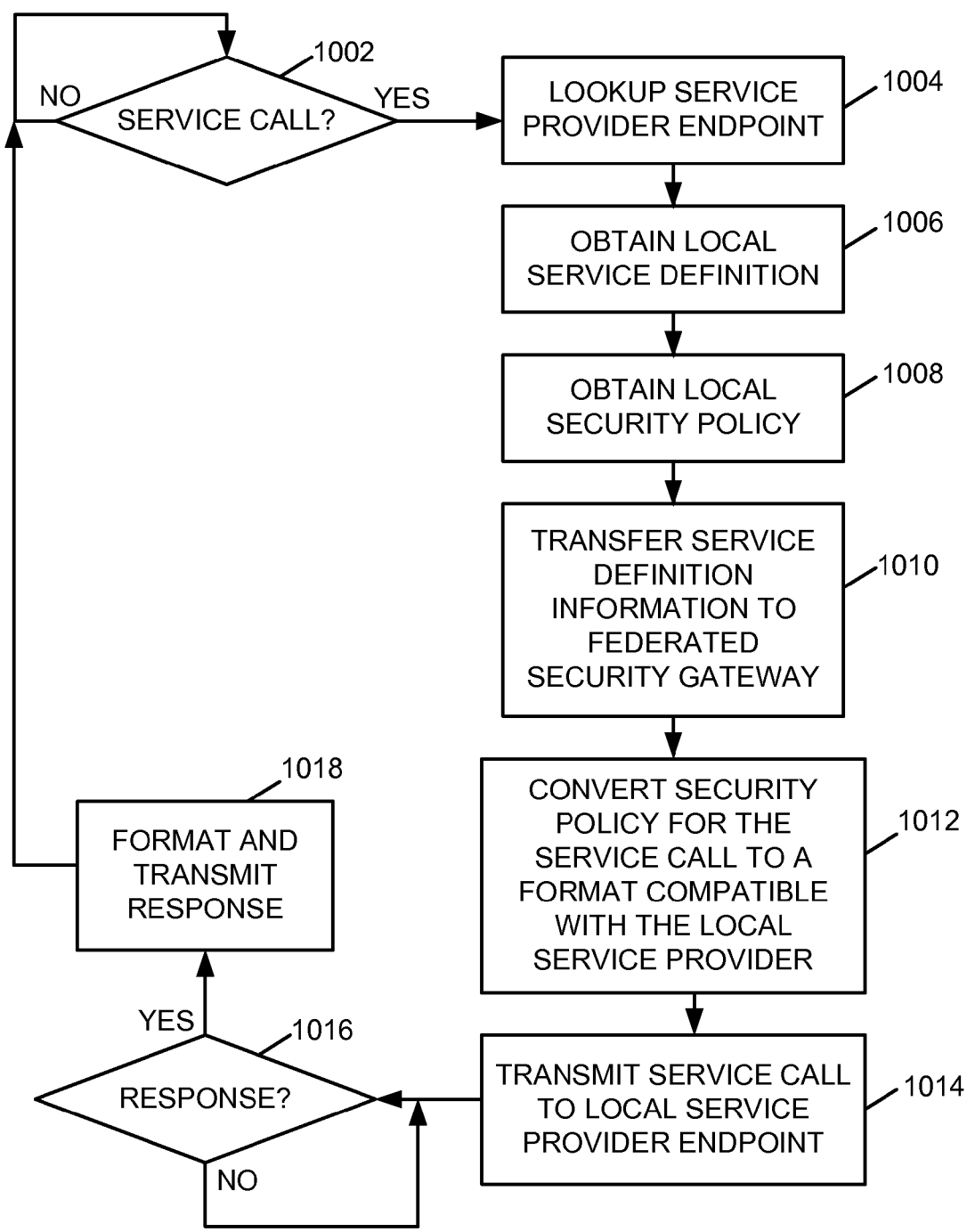

FIG. 10 is a flow chart of an example of an implementation of a process 1000 for processing of an inter-domain service call received from a service consumer in a remote independent IT management domain, such as the Domain A 102. At decision point 1002, the process 1000 makes a determination as to whether a service call has been received. As described above, the service call endpoint received from the remote IT management domain will be the federated gateway itself. In response to determining that a service call has been received, the process 1000 authenticates the request by checking the security token and then performs a lookup of the service provider endpoint of the actual local service provider application, such as the service provider 318 within the Domain B 104, at block 1004.

At block 1006, the process 1000 obtains a local service definition for the local service provider application. At block 1008, the process 1000 obtains a local security policy for the local service provider application. At block 1010, the process 1000 transfers the service definition information to the access/identity manager 324 operating within the logical federated security gateway 306 to hand over the processing of the service call. At block 1012, the process 1000, in cooperation with the access/identity manager 324, performs processing for conversion into the security policy that is to be used for the service call. At block 1014, the process 1000 transmits the service call to the local service provider endpoint.

At decision point 1016, the process 1000 makes a determination as to whether a response has been received from the local service provider endpoint. In response to determining that a response has been received from the local service provider endpoint, the process 1000 formats and transmits the response to the security gateway 310 operating within the architectural interconnection (gateway) 300 of the Domain A 102 for processing and delivery to the service consumer that originated the service call. The process 1000 returns to decision point 1002 and iterates as described above.

As described above in association with FIG. 1 through FIG. 10, the example systems and processes provide automated inter-domain replication of service information. Many other variations and additional activities associated with automated inter-domain replication of service information are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    performing an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and
    dynamically performing, in response to at least one service request for the at least one remote service provider application, service provider application endpoint translation using the federated gateway within each of the independent enterprise IT management domains that bridges the independent enterprise IT management domains;
    where performing the automated conversion of the service information comprising the endpoint addresses of service providers and security policies between the independent enterprise IT management domains using the federated gateway within each of the independent enterprise IT management domains that bridges the independent enterprise IT management domains comprises:
        converting the remote service interface to a local service interface defined with the local service definition format; and
        registering the local service interface that represents the converted remote service interface within a local runtime service registry that forms a portion of a federated service registry of the federated gateway, and that is accessible by the at least one service consumer application executing within the first independent enterprise IT management domain; and
    where converting the remote service interface to the local service interface defined with the local service definition format comprises:
        replacing an endpoint address of the at least one remote service provider application within the second independent enterprise IT management domain with an endpoint address of a remote governance service registry of the federated gateway; and
        re-writing the remote service interface definition to convert from a remote protocol to a local protocol used by the local service interface.

2. A method, comprising:
    performing an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and
    dynamically performing, in response to at least one service request for the at least one remote service provider application, service provider application endpoint translation using the federated gateway within each of the independent enterprise IT management domains that bridges the independent enterprise IT management domains;
    where performing the automated conversion of the service information comprising the endpoint addresses of service providers and security policies between the independent enterprise IT management domains using the federated gateway within each of the independent enterprise IT management domains that bridges the independent enterprise IT management domains comprises:
        converting the remote service interface to a local service interface defined with the local service definition format; and
        registering the local service interface that represents the converted remote service interface within a local runtime service registry that forms a portion of a federated service registry of the federated gateway, and that is accessible by the at least one service consumer application executing within the first independent enterprise IT management domain; and
    where converting the remote service interface to the local service interface defined with the local service definition format comprises:

replacing remote security policy information used for originating the at least one service request with local security policy information mapped to the remote security policy information via a local access/identity manager and a remote access/identity manager that form a federated security gateway that bridges security policy information between the independent enterprise IT management domains as part of the federated gateway within each of the independent enterprise IT management domains.

3. The method of claim 1, where dynamically performing, in response to the at least one service request for the at least one remote service provider application, the service provider application endpoint translation using the federated gateway within each of the independent enterprise IT management domains that bridges the independent enterprise IT management domains comprises:

routing the at least one service request via a federated enterprise service bus (ESB) comprising a local ESB within the first independent enterprise IT management domain and a remote ESB within the second independent enterprise IT management domain, where the local ESB and the remote ESB form a federated ESB gateway that bridges routing between the independent enterprise IT management domains as part of the federated gateway within each of the independent enterprise IT management domains; and providing connectivity mediation between the independent enterprise IT management domains via the federated ESB.

4. The method of claim 3, where providing the connectivity mediation between the independent enterprise IT management domains via the federated ESB comprises:

performing token exchange between a security gateway within the federated ESB and a local access/identity manager that forms a portion of a federated security gateway that bridges security policy information between the independent enterprise IT management domains as part of the federated gateway within each of the independent enterprise IT management domains.

5. The method of claim 4, where providing the connectivity mediation between the independent enterprise IT management domains via the federated ES B further comprises:

performing token exchange between the local access/identity manager and a remote access/identity manager within the second independent enterprise IT management domain that forms another portion of the federated security gateway that bridges the security policy information between the independent enterprise IT management domains as part of the federated gateway within each of the independent enterprise IT management domains.

6. A system, comprising:

a federated gateway comprising at least a federated enterprise service bus (ESB) comprising a local ESB operable within a first independent enterprise information technology (IT) management domain to interconnect with a remote ESB operable within a second independent enterprise IT management domain;

a local governance service registry;
a local runtime service registry; and
a processor programmed to:
perform an automated conversion of service information comprising endpoint addresses of service providers and security policies between independent enterprise IT management domains using the federated gateway within each of the independent enterprise IT management domains that bridges the independent enterprise IT management domains, where the automated conversion of the service information allows at least one service consumer application executing within the first independent enterprise IT management domain to use a local service definition format to access at least one remote service provider application with a remote service interface defined using a different remote service definition format for execution in the second independent enterprise IT management domain; and dynamically perform, in response to at least one service request for the at least one remote service provider application, service provider application endpoint translation using the federated gateway within each of the independent enterprise IT management domains that bridges the independent enterprise IT management domains;

where in being programmed to perform the automated conversion of the service information comprising the endpoint addresses of service providers and security policies between the independent enterprise IT management domains using the federated gateway within each of the independent enterprise IT management domains that bridges the independent enterprise IT management domains, the processor is programmed to:

convert the remote service interface to a local service interface defined with the local service definition format; and register the local service interface that represents the converted remote service interface within the local runtime service registry that forms a portion of a federated service registry of the federated gateway, and that is accessible by the at least one service consumer application executing within the first independent enterprise IT management domain; and where in being programmed to convert the remote service interface to the local service interface defined with the local service definition format, the processor is programmed to:

replace an endpoint address of the at least one remote service provider application within the second independent enterprise IT management domain with an endpoint address of the remote governance service registry of the federated gateway; and re-write the remote service interface definition to convert from a remote protocol to a local protocol used by the local service interface.

7. A system, comprising:

a federated gateway comprising at least a federated enterprise service bus (ESB) comprising a local ESB operable within a first independent enterprise information technology (IT) management domain to interconnect with a remote ESB operable within a second independent enterprise IT management domain;

a local governance service registry;
a local runtime service registry; and
a processor programmed to:
perform an automated conversion of service information comprising endpoint addresses of service providers and security policies between independent enterprise IT management domains using the federated gateway within each of the independent enterprise IT management domains that bridges the independent enterprise IT management domains, where the automated conversion of the service information allows at least one service consumer application executing within the first independent enterprise IT management domain to use a local service definition format to access at least one remote service provider application with a remote service interface defined using a different remote service definition format for execution in the second independent enterprise IT management domain; and dynamically perform, in response to at least one service request for the at least one remote service provider application, service provider application endpoint translation using the federated gateway within each of the independent enterprise IT management domains that bridges the independent enterprise IT management domains;

where in being programmed to perform the automated conversion of the service information comprising the endpoint addresses of service providers and security policies between the independent enterprise IT management domains using the federated gateway within each of the independent enterprise IT management domains that bridges the independent enterprise IT management domains, the processor is programmed to:

convert the remote service interface to a local service interface defined with the local service definition format; and register the local service interface that represents the converted remote service interface within the local runtime service registry that forms a portion of a federated service registry of the federated gateway, and that is accessible by the at least one service consumer application executing within the first independent enterprise IT management domain; and where in being programmed to convert the remote service interface to the local service interface defined with the local service definition format, the processor is programmed to:

replace remote security policy information used for originating the at least one service request with local security policy information mapped to the remote security policy information via a local access/identity manager and a remote access/identity manager that form a federated security gateway that bridges security policy information between the independent enterprise IT management domains as part of the federated gateway within each of the independent enterprise IT management domains.

8. The system of claim 6, where in being programmed to dynamically perform, in response to the at least one service request for the at least one remote service provider application, the service provider application endpoint translation using the federated gateway within each of the independent enterprise IT management domains that bridges the independent enterprise IT management domains, the processor is programmed to:

route the at least one service request via the federated ESB comprising the local ESB within the first independent enterprise IT management domain and the remote ESB within the second independent enterprise IT management domain, where the local ESB and the remote ESB form a federated ESB gateway that bridges routing between the independent enterprise IT management domains as part of the federated gateway within each of the independent enterprise IT management domains; and provide connectivity mediation between the independent enterprise IT management domains via the federated ESB.

9. The system of claim 8, where in being programmed to provide the connectivity mediation between the independent enterprise IT management domains via the federated ESB, the processor is programmed to:

perform token exchange between a security gateway within the federated ESB and a local access/identity manager that forms a portion of a federated security gateway that bridges security policy information between the independent enterprise IT management domains as part of the federated gateway within each of the independent enterprise IT management domains.

10. The system of claim 9, where in being programmed to provide the connectivity mediation between the independent enterprise IT management domains via the federated ESB, the processor is further programmed to:

perform token exchange between the local access/identity manager and a remote access/identity manager within the second independent enterprise IT management domain that forms another portion of the federated security gateway that bridges the security policy information between the independent enterprise IT management domains as part of the federated gateway within each of the independent enterprise IT management domains.

11. A computer program product comprising a non-transitory computer readable storage medium including computer readable program code, where the computer readable program code when executed on a computer causes the computer to:

perform an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and dynamically perform, in response to at least one service request for the at least one remote service provider application, service provider application endpoint translation using the federated gateway within each of the independent enterprise IT management domains that bridges the independent enterprise IT management domains; and where, in causing the computer to perform the automated conversion of the service information comprising the endpoint addresses of service providers and security policies between the independent enterprise IT management domains using the federated gateway within each of the independent enterprise IT management domains that bridges the independent enterprise IT management domains, the computer readable program code when executed on the computer causes the computer to:

convert the remote service interface to a local service interface defined with the local service definition format; and register the local service interface that represents the converted remote service interface within a local runtime service registry that forms a portion of a federated service registry of the federated gateway, and that is accessible by the at least one service consumer application executing within the first independent enterprise IT management domain; and where, in causing the computer to convert the remote service interface to the local service interface defined with the local service definition format, the computer readable program code when executed on the computer causes the computer to:

replace an endpoint address of the at least one remote service provider application within the second independent enterprise IT management domain with an endpoint address of a remote governance service registry of the federated gateway; and re-write the remote service interface definition to convert from a remote protocol to a local protocol used by the local service interface.

12. A computer program product, comprising a non-transitory computer readable storage medium including computer readable program code, where the computer readable program code when executed on a computer causes the computer to:

perform an automated conversion of service information comprising endpoint addresses of service providers and security policies between independent enterprise information technology (IT) management domains using a federated gateway within each of the independent enterprise IT management domains that bridges the independent enterprise IT management domains, where the automated conversion of the service information allows at least one service consumer application executing within a first independent enterprise IT management domain to use a local service definition format to access at least one remote service provider application with a remote service interface defined using a different remote service definition format for execution in a second independent enterprise IT management domain; and dynamically perform, in response to at least one service request for the at least one remote service provider application, service provider application endpoint translation using the federated gateway within each of the independent enterprise IT management domains that bridges the independent enterprise IT management domains; and where, in causing the computer to perform the automated conversion of the service information comprising the endpoint addresses of service providers and security policies between the independent enterprise IT management domains using the federated gateway within each of the independent enterprise IT management domains that bridges the independent enterprise IT management domains, the computer readable program code when executed on the computer causes the computer to:

convert the remote service interface to a local service interface defined with the local service definition format; and register the local service interface that represents the converted remote service interface within a local runtime service registry that forms a portion of a federated service registry of the federated gateway, and that is accessible by the at least one service consumer application executing within the first independent enterprise IT management domain; and where, in causing the computer to convert the remote service interface to the local service interface defined with the local service definition format, the computer readable program code when executed on the computer causes the computer to:

replace remote security policy information used for originating the at least one service request with local security policy information mapped to the remote security policy information via a local access/identity manager and a remote access/identity manager that form a federated security gateway that bridges security policy information between the independent enterprise IT management domains as part of the federated gateway within each of the independent enterprise IT management domains.

13. The computer program product of claim 11, where, in causing the computer to dynamically perform, in response to the at least one service request for the at least one remote service provider application, the service provider application endpoint translation using the federated gateway within each of the independent enterprise IT management domains that bridges the independent enterprise IT management domains, the computer readable program code when executed on the computer causes the computer to:

route the at least one service request via a federated enterprise service bus (ESB) comprising a local ESB within the first independent enterprise IT management domain and a remote ESB within the second independent enterprise IT management domain, where the local ESB and the remote ESB form a federated ESB gateway that bridges routing between the independent enterprise IT management domains as part of the federated gateway within each of the independent enterprise IT management domains; and provide connectivity mediation between the independent enterprise IT management domains via the federated ESB.

14. The computer program product of claim 13, where, in causing the computer to provide the connectivity mediation between the independent enterprise IT management domains via the federated ESB, the computer readable program code when executed on the computer causes the computer to:

perform token exchange between a security gateway within the federated ESB and a local access/identity manager that forms a portion of a federated security gateway that bridges security policy information between the independent enterprise IT management domains as part of the federated gateway within each of the independent enterprise IT management domains.

15. The computer program product of claim 14, where, in causing the computer to provide the connectivity mediation between the independent enterprise IT management domains via the federated ESB, the computer readable program code when executed on the computer further causes the computer to:

perform token exchange between the local access/identity manager and a remote access/identity manager within the second independent enterprise IT management domain that forms another portion of the federated security gateway that bridges the security policy information between the independent enterprise IT management domains as part of the federated gateway within each of the independent enterprise IT management domains.

16. The method of claim 2, where dynamically performing, in response to the at least one service request for the at least one remote service provider application, the service provider application endpoint translation using the federated gateway within each of the independent enterprise IT management domains that bridges the independent enterprise IT management domains comprises:

routing the at least one service request via a federated enterprise service bus (ESB) comprising a local ESB within the first independent enterprise IT management domain and a remote ESB within the second independent enterprise IT management domain, where the local ESB and the remote ESB form a federated ESB gateway that bridges routing between the independent enterprise IT management domains as part of the federated gateway within each of the independent enterprise IT management domains; and providing connectivity mediation between the independent enterprise IT management domains via the federated ESB.

17. The method of claim 16, where providing the connectivity mediation between the independent enterprise IT management domains via the federated ESB comprises:

performing token exchange between a security gateway within the federated ESB and the local access/identity manager that forms a portion of the federated security gateway that bridges the security policy information between the independent enterprise IT management domains as part of the federated gateway within each of the independent enterprise IT management domains.

18. The system of claim 7, where in being programmed to dynamically perform, in response to the at least one service request for the at least one remote service provider application, the service provider application endpoint translation using the federated gateway within each of the independent enterprise IT management domains that bridges the independent enterprise IT management domains, the processor is programmed to:

route the at least one service request via the federated ESB comprising the local ESB within the first independent enterprise IT management domain and the remote ESB within the second independent enterprise IT management domain, where the local ESB and the remote ESB form a federated ESB gateway that bridges routing between the independent enterprise IT management domains as part of the federated gateway within each of the independent enterprise IT management domains; and provide connectivity mediation between the independent enterprise IT management domains via the federated ESB.

19. The system of claim 18, where in being programmed to provide the connectivity mediation between the independent enterprise IT management domains via the federated ESB, the processor is programmed to:

perform token exchange between a security gateway within the federated ESB and the local access/identity manager that forms a portion of the federated security gateway that bridges the security policy information between the independent enterprise IT management domains as part of the federated gateway within each of the independent enterprise IT management domains.

20. The computer program product of claim 12, where, in causing the computer to dynamically perform, in response to the at least one service request for the at least one remote service provider application, the service provider application endpoint translation using the federated gateway within each of the independent enterprise IT management domains that bridges the independent enterprise IT management domains, the computer readable program code when executed on the computer causes the computer to:

route the at least one service request via a federated enterprise service bus (ESB) comprising a local ESB within the first independent enterprise IT management domain and a remote ESB within the second independent enterprise IT management domain, where the local ESB and the remote ESB form a federated ESB gateway that bridges routing between the independent enterprise IT management domains as part of the federated gateway within each of the independent enterprise IT management domains; and provide connectivity mediation between the independent enterprise IT management domains via the federated ESB.

21. The computer program product of claim 20, where, in causing the computer to provide the connectivity mediation between the independent enterprise IT management domains via the federated ESB, the computer readable program code when executed on the computer causes the computer to:

perform token exchange between a security gateway within the federated ESB and the local access/identity manager that forms a portion of the federated security gateway that bridges the security policy information between the independent enterprise IT management domains as part of the federated gateway within each of the independent enterprise IT management domains.

* * * * *